United States Patent
Park et al.

(10) Patent No.: US 12,256,851 B2
(45) Date of Patent: Mar. 25, 2025

(54) DEVICE AND METHOD OF DELIVERING ITEM ALONG ROUTE

(71) Applicant: SAMSUNG ELECTRONICS CO., LTD., Suwon-si (KR)

(72) Inventors: Jiwon Park, Suwon-si (KR); Seungjoon Lee, Suwon-si (KR); Yeeun Choi, Suwon-si (KR); Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 17/940,821

(22) Filed: Sep. 8, 2022

(65) Prior Publication Data

US 2023/0136665 A1   May 4, 2023

Related U.S. Application Data

(63) Continuation of application No. PCT/KR2022/011887, filed on Aug. 10, 2022.

(51) Int. Cl.
*A47F 10/06* (2006.01)
*A47B 31/00* (2006.01)
(Continued)

(52) U.S. Cl.
CPC .............. *A47F 10/06* (2013.01); *A47B 31/00* (2013.01); *G01C 21/20* (2013.01); *G06Q 10/083* (2013.01); *A47B 2031/002* (2013.01)

(58) Field of Classification Search
CPC ... A47F 10/06; A47B 31/00; A47B 2031/002; G01C 21/20; G01C 21/206;
(Continued)

(56) References Cited

U.S. PATENT DOCUMENTS 10,399,778 B1   9/2019   Shekhawat et al.
10,994,418 B2   5/2021   Kichkaylo et al.
(Continued)

FOREIGN PATENT DOCUMENTS

JP   2001-300876   10/2001
JP   2009-172410    8/2009
(Continued)

OTHER PUBLICATIONS

English translation of Akiyama et al. (JP 2001300876) (Year: 2001).*
(Continued)

*Primary Examiner* — James M McPherson
*Assistant Examiner* — Kyle J Kingsland
(74) *Attorney, Agent, or Firm* — Nixon & Vanderhye P.C.

(57) ABSTRACT

Provided is an electronic device configured to generate a route including a point of departure and a first destination determined based on order information, while the electronic
(Continued)

device is moved along the route using a driver, in response to not receiving an order from the first destination on which seating information indicating at least one seated customer is identified, perform an operation of outputting information indicating a serving tray accommodating a basic item based on the electronic device reaching the first destination, and based on a drive along the route being completed, in response to not delivering, to the first destination, at least one item indicated in an order received from the first destination, exclude the first destination from the route.

20 Claims, 13 Drawing Sheets

(51) Int. Cl.
  *G01C 21/20* (2006.01)
  *G06Q 10/083* (2024.01)
(58) Field of Classification Search
  CPC ............... G01C 21/343; G06Q 10/083; G06Q 10/08355; G06Q 10/087; G06Q 20/20; G06Q 50/12; B25J 5/00; B25J 11/00
  See application file for complete search history.

(56) References Cited

U.S. PATENT DOCUMENTS

| | | | | |
|---|---|---|---|---|
| 2009/0048890 | A1* | 2/2009 | Burgh | G06Q 10/06375 705/7.26 |
| 2020/0339354 | A1 | 10/2020 | Soto Arriaza | |
| 2021/0033405 | A1 | 2/2021 | Song et al. | |
| 2021/0102817 | A1* | 4/2021 | Kim | G06Q 10/06315 |
| 2023/0030633 | A1* | 2/2023 | Ha | B25J 9/163 |

FOREIGN PATENT DOCUMENTS

| | | | |
|---|---|---|---|
| JP | 2021-074492 | A | 5/2021 |
| KR | 10-2019-0106910 | A | 9/2019 |
| KR | 10-2020-0087362 | | 7/2020 |
| KR | 10-2021-0015577 | | 2/2021 |
| KR | 10-2021-0028539 | | 3/2021 |
| KR | 10-2021-0072588 | | 6/2021 |
| KR | 10-2021-0119885 | A | 10/2021 |
| KR | 10-2315925 | B1 | 10/2021 |
| KR | 20210119886 | A * | 10/2021 |
| WO | WO-2017006291 | A1 * | 1/2017 |
| WO | WO 2020/141622 | A1 | 7/2020 |

OTHER PUBLICATIONS

English translation of Kim et al. (KR 20210119886) (Year: 2021).*
Pudu Robotics; Youtube video titled âBellaBot Features-BellaBot for delivery food can be change place to placeâ; Jan. 4, 2020, https://www.youtube.com/watch?v=lodHg17tiHg&t=1s (Year: 2020).*
Search Report dated Nov. 15, 2022 issued in International Patent Application No. PCT/KR2022/011887.
Extended European Search Report dated Oct. 10, 2024 for EP Application No. 22890134.4.

* cited by examiner

DEVICE AND METHOD OF DELIVERING ITEM ALONG ROUTE

CROSS-REFERENCE TO RELATED APPLICATIONS

This application is a continuation of International Application No. PCT/KR2022/011887 designating the United States, filed on Aug. 10, 2022, in the Korean Intellectual Property Receiving Office and claiming priority to Korean Patent Application No. 10-2021-0150687, filed on Nov. 4, 2021, in the Korean Intellectual Property Office, and to Korean Patent Application No. 10-2021-0165511, filed on Nov. 26, 2021, in the Korean Intellectual Property Office, the disclosures of all of which are incorporated by reference herein in their entireties.

BACKGROUND

1. Field

The disclosure relates to a device and method of delivering an item along a route.

2. Description of Related Art

Recently, driven by the advancement of electronics technology, various types of electronic devices have been developed and distributed. In stores, cafes, restaurants, and the like, electronic devices, such as kiosks and robots, that replace humans have been actively used. The electronic devices may perform operations, such as processing an order requested by a customer and delivering the order to a customer.

However, there has also been a constant demand for a method of efficiently delivering ordered food to satisfy many customers and providing a consistent service to many customers such that an electronic device, such as a robot, may perform labor rather perfectly, thus replacing humans. A needed method may efficiently deliver ordered food and a service item by a few robots while satisfying many customers.

SUMMARY

Embodiments of the disclosure may provide an electronic device configured to autonomously determine a destination to be circularly visited.

Embodiments of the disclosure may provide an electronic device that may determine a dynamic interaction to be performed at the circularly visited destination.

Embodiments of the disclosure may provide an electronic device that may determine to revisit the circularly visited destination, based on feedback therefrom.

According to example embodiments, an electronic device includes: a communication module comprising communication circuitry; a driver comprising a motor; a memory configured to store computer-executable instructions; and a processor configured to execute the computer-executable instructions by accessing the memory, wherein the processor, by executing the computer-executable instructions, is configured to: establish communication with an order server using the communication module and receive order information from the order server, generate a route including a point of departure and a first destination determined based on the order information, while the electronic device is moved along the route using the driver, in response to not receiving an order from the first destination identified based on seating information indicating at least one seated customer, perform an operation of outputting information indicating a serving tray accommodating a basic item based on the electronic device reaching the first destination, and based on a drive along the route being completed, in response to not delivering, to the first destination, at least one item indicated in an order received from the first destination, exclude the first destination from the route.

According to example embodiments, a method performed by an electronic device includes: receiving order information from an order server; generating a route including a point of departure and a first destination determined based on the order information; while the electronic device is moved along the route using a driver, in response to not receiving an order from the first destination identified based on seating information indicating at least one seated customer, performing an operation of outputting information indicating a serving tray accommodating a basic item based on the electronic device reaching the first destination; and based on a drive along the route being completed, in response to not delivering, to the first destination, at least one item indicated in an order received from the first destination, excluding the first destination from the route.

According to various example embodiments, an electronic device may reduce time and cost consumed for repetitive delivery of the same item by interoperating with a point-of-sales (POS) device and informing a customer of an item needed in a service state of each destination.

The electronic device according to various example embodiments may minimize and/or reduce a user's intervention by providing the repetitive delivery of the same item through a circular drive.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
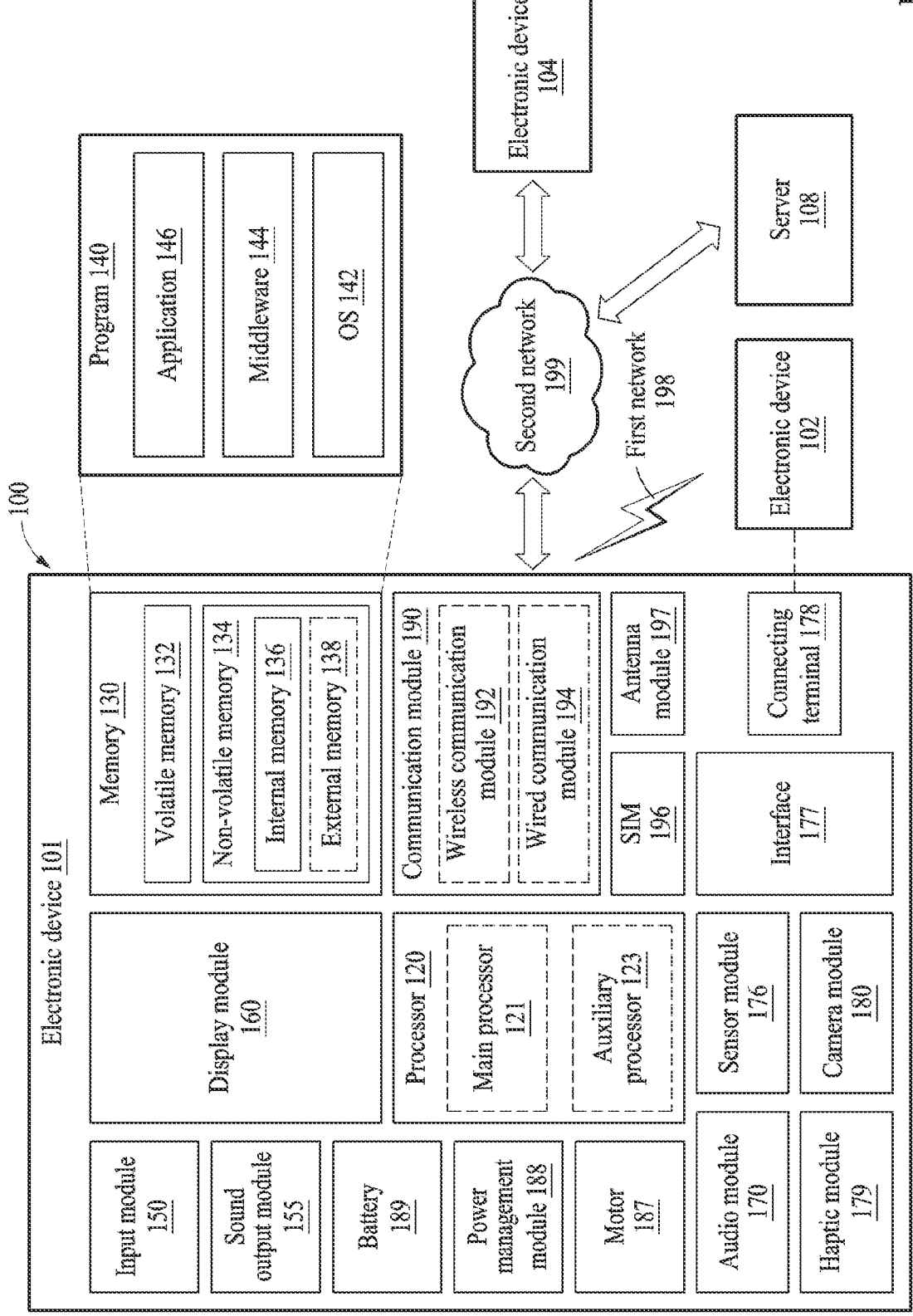
FIG. 1 is a block diagram illustrating an example electronic device in a network environment according to various example embodiments.

Hereinafter, example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a motor 187, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added to the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display module 160 may include a touch sensor adapted to detect a touch, or a pressure sensor adapted to measure the intensity of force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

Figure 2:
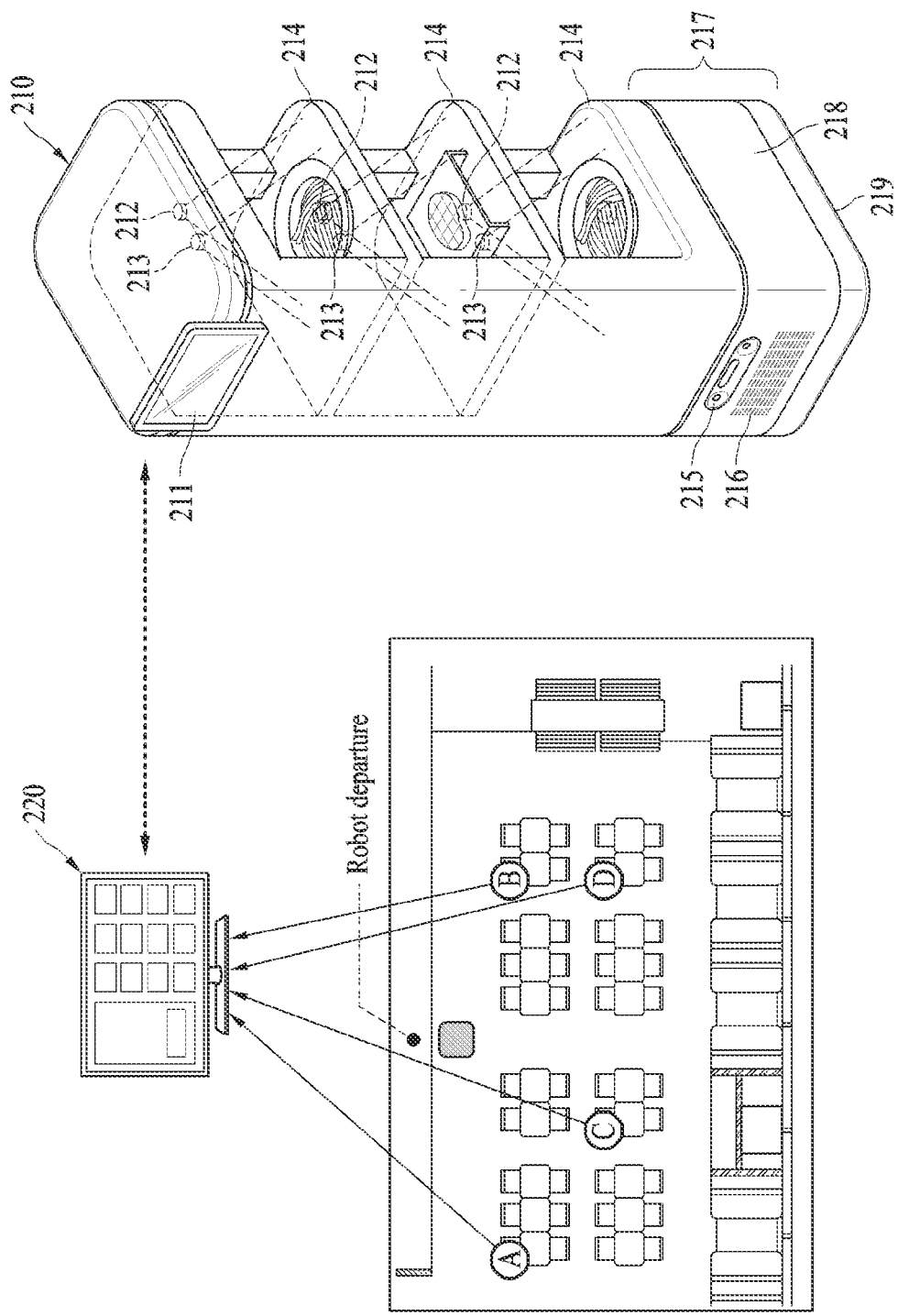
FIG. 2 is a diagram illustrating an example electronic device implemented as a serving robot according to various example embodiments.

A driving module may drive the electronic device 101. The driving module may include the motor 187 and a wheel connected to the motor 187. In FIG. 2 to be described below, illustrated is an example of a pair of wheels spaced and disposed along an axis (e.g., a lateral axis) perpendicular to a driving direction (e.g., a longitudinal axis) at a bottom center of the electronic device 101, but examples are not limited thereto. The disposition and number of wheels of the motor 187 of the driving module may vary depending on a design.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an example embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

FIG. 2 is a diagram illustrating an example electronic device implemented as a serving robot according to various example embodiments.

An electronic device 210 (e.g., the electronic device 101 of FIG. 1) may be implemented as a serving robot as illustrated in FIG. 2. For example, the electronic device 210 may be a public mobile robot, which is a serving robot configured to autonomously drive and visit a plurality of destinations (e.g., a table). The electronic device 210 may establish communication with an order server 220 (e.g., the server 108 of FIG. 1) and receive, from the order server 220, information related to orders of customers among the plurality of destinations.

The order server 220 may manage order information of each destination. For example, the order server 220 may collect order information (e.g., point-of-sale (POS) data) on a customer of each destination from the electronic device 210 and/or an external device (e.g., a mobile terminal of a customer, a tablet terminal of an employee, and a kiosk terminal). The order information may include at least one of seated information of each destination, order receiving information, ordered menu item information, or serving information. The seated (e.g., seating) information of each destination may include identification information (e.g., a table number and a table location) of the destination, whether a customer sits in the destination, and the number of seated customers. The order receiving information of each destination may include whether a customer seated in the destination places an order and the time of the order. The ordered menu item information of each destination may include a type of item ordered by a seated customer at the destination and the number of ordered items. The serving information of each destination may include whether each item ordered from each destination has been served. In addition, the order information may include a side item (e.g., a side menu item) accompanying an ordered main item (e.g., a main dish), a special order (e.g., whether additional tableware is needed), additional food, whether a customer is a customer with a reservation, the number of visits of the customer, and whether the customer is a very-important-person (VIP) customer.

The electronic device 210 may include a display module (e.g., including a display) 211 (e.g., the display module 160 of FIG. 1), a camera module (e.g., including a camera) 212 (e.g., the camera module 180 of FIG. 1), a lighting module (including light emitting circuitry) 213, a serving tray 214, a sensor module (e.g., including a sensor) 215 (e.g., the sensor module 176 of FIG. 1), a sound output module (e.g., including sound output circuitry) 216 (e.g., the sound output module 155 of FIG. 1), a communication module (e.g., including communication circuitry 218 (e.g., the communication module 190 of FIG. 1), and a driver (e.g., including a motor) 219 (e.g., the motor 187 of FIG. 1). Although in FIG. 2, the sensor module 215, the sound output module 216, the communication module 218, and the driver 219 are illustrated as being included in a base driving platform 217, examples are not limited thereto. The base driving platform 217 may further include a battery (e.g., the battery 189 of FIG. 1) and a power management module (e.g., the power management module 188 of FIG. 1).

The display module 211 may include a display and visually output information related to item delivery to at least one of a user and a customer. For example, the display module 211 may output visual information (e.g., text and an image) that guides the user and the customer to an item to be delivered to a destination where the electronic device 210 reaches.

In addition, the electronic device 210 may further include an input module (e.g., the input module 150 of FIG. 1) including various input circuitry integrated with the display module 211. The electronic device 210, through the input module, may receive at least one of a touch input and a voice input from at least one of a user and a customer.

The camera module 212 may include a camera and face each serving tray. For example, in FIG. 2, the camera module 212 may face a serving tray from the ceiling facing the serving tray. In other words, the camera module 212 may have a view angle for capturing the serving tray. The camera module 212 may capture an image including an item (e.g., food) on the serving tray. A processor (e.g., the processor 120 of FIG. 1) of the electronic device 210, based on an image captured by the camera module 212, may recognize a type (e.g., a food type) of item on each serving tray and the number of items (e.g., the number of food items).

The lighting module 213 may be a module and include various circuitry for projecting light onto a serving tray. The lighting module 213, when the electronic device 210 reaches a first destination to which a target item on a serving tray needs to be delivered, may light up the serving tray and the target item on the serving tray.

Each serving tray (e.g., the serving tray 214) may be a tray for accommodating an item. Although in FIG. 2 three serving trays are illustrated as being spaced and in a direction perpendicular to the ground, the number and structure of the serving tray 214 may not be limited thereto and may vary depending on a design. At least one serving tray among a plurality of serving trays may be on the same surface as another serving tray. The electronic device 210 may include one or more serving trays (e.g., the serving tray 214). For example, a first serving tray among the plurality of serving trays may accommodate a basic item (e.g., a menu, water, tableware, and a plate). The basic item may be an item that needs to be basically provided before a main item (e.g., a main dish) being provided to a seated customer at a destination. For reference, the main item may be served to the seated customer by another serving robot or an employee. A second serving tray may accommodate an auxiliary item (e.g., a side dish). The auxiliary item may be an item accompanying an item (e.g., the main item) ordered by a customer and may be provided with the ordered item as a set. A third serving tray may accommodate an additional item (e.g., kids tableware, shared tableware, and special tableware). However, the foregoing example is merely an example for helping understanding, and an item accommodated in each serving tray may not be limited thereto.

The sensor module 215 may include a sensor for driving the electronic device 210. For example, the sensor module 215 may include at least one of a light detection and ranging (LiDAR) sensor, a depth sensor (e.g., a time-of-flight (ToF) sensor), and an ultrasonic sensor. The electronic device 210, through the sensor module 215, may set a driving route by detecting an object and the background around the electronic device 210 and perform a maneuver for avoiding an obstacle.

The sound output module 216 may include various sound output circuitry and output, to a customer, a sound signal (e.g., voice guidance) for indicating information (e.g., the name and number of currently delivered items) related to item delivery. The sound output module 216 may record a sound signal (e.g., guidance to a customer) to be delivered from a user to the customer and a sound signal (e.g., a request from the customer) to be delivered from the customer to the user. In FIG. 2, for example, a speaker of the sound output module 216 is illustrated as being at the lower part of the electronic device 210, and a microphone of the sound output module 216 may be integrated with the display module 211.

The communication module 218 may include various communication circuitry and establish wired or wireless communication with the order server 220. The processor of the electronic device 210 may include various processing circuitry and establish communication with the order server 220 using the communication module 218 and may receive order information from the order server 220. The order information may include at least one of seated information of each destination, order receiving information, ordered menu item information, and serving information. The order information may be generated based on POS data. For example, the communication module 218 may receive POS data from the order server 220. The POS data may include one or more pieces of order data that indicate an item ordered by each customer. The item, for example, may include food items and things. The communication module 218, when delivery of a target item is completed by the electronic device 210, may report the completed delivery of the target item (e.g., served food) to the order server 220. In addition, the communication module 218 may establish communication with an external device (e.g., another terminal of a user and a wearable device) other than the order server 220. The communication module 218 may transfer an anomaly detected by the electronic device 210 to the other terminal of the user.

The driver 219 may move the electronic device 210. The driver 219 may include a motor and wheels. The driver 219 may move the electronic device 210 forward and backward and rotate the electronic device 210 on the ground by driving the motor. For example, the processor of the electronic device 210 may move the electronic device 210 along a route including a point of departure and one or more destinations (e.g., a first destination) using the driver 219. The point of departure may be a reference point at which a route starts and may be a position where the electronic device 210 waits before initiating a circular drive. For example, the route may be a circular route.

The electronic device 210 may serve simultaneously prepared items (e.g., simultaneously cooked food items) in a service space (e.g., a restaurant) to multiple destinations (e.g., multiple tables) in one drive. For reference, an example of the electronic device 210 accommodating an item visiting the first destination is mainly described herein, but examples are not limited thereto. When the electronic device 210 visits a plurality of destinations (e.g., first and second destinations), the electronic device 210 may visit the destinations in a serving sequence by identifying an item on each serving tray.

Figure 3:
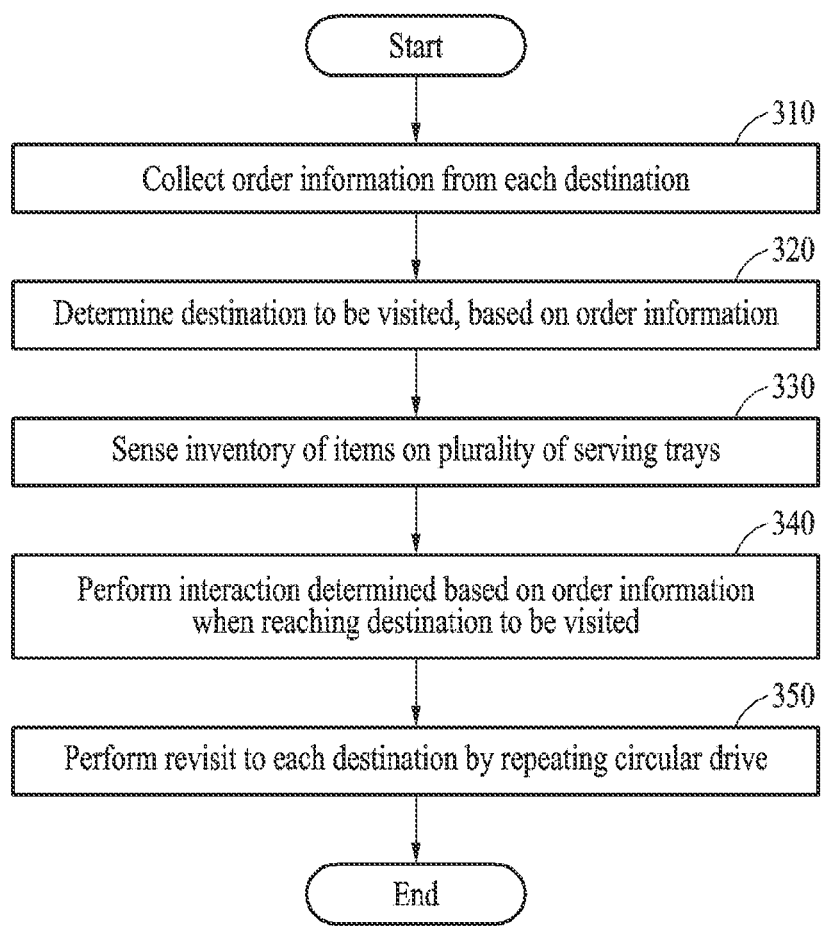
FIG. 3 is a flowchart illustrating an example circular serving method of an electronic device according to various example embodiments.

FIG. 3 is a flowchart illustrating an example circular serving method of an electronic device according to various example embodiments.

In operation 310, an electronic device (e.g., the electronic device 101 of FIG. 1) may collect order information of each destination. As described above, the electronic device may collect, as order information, seated information (e.g., sitting completion, the number of customers, destination identification information, and seated time), order receiving information (e.g., order received time), order menu item information (e.g., a name of a menu item ordered by a customer, a quantity, and whether an order is a general order or a special order), and serving information (e.g., whether serving is completed). In addition, the electronic device may collect additional information (e.g., whether a child is accompanied, a customer type, such as gender, and whether a reservation has been made). The general order may be an order for a menu item providing only a main item (e.g., food), and a special order may be an order for a menu item requesting an additional item (e.g., kids tableware, tableware for sharing food, and other special tableware). The tableware for sharing food may be an item (e.g., a knife) for dividing a sharable food item (e.g., pizza and steak).

In operation 320, the electronic device may determine a destination to be visited, based on order information. The electronic device may generate a route including a point of departure and a first destination determined based on the order information. For example, the electronic device may identify a service state of an individual destination, based on the order information described above. The service state may be a state of service being provided for an order received at each destination. An example of the service state may be described below with reference to FIG. 3. The electronic device may determine whether to visit a destination, based on a service state determined for each destination. The electronic device may generate a route, based on one or more destinations (e.g., a first destination) determined to be visited. The electronic device may be a serving robot for accommodating an item universally needed at each destination and circularly driving itself, and the route may be a route set for a circular drive of the serving robot.

In operation 330, the electronic device may sense the inventory of items on a plurality of serving trays. The electronic device may monitor a type and quantity of items on each serving tray, based on data collected using a sensor installed on each of the plurality of serving trays. For example, the electronic device may sense the items on each serving tray through vision recognition using a camera module. The electronic device may compare a prepared item with an item needed for each destination. For example, the electronic device may identify whether an item is recognized and a type (e.g., a type of side dish, a place, and tableware) and quantity of a recognized item. The electronic device may replenish an insufficient item when the number of prepared items on each serving tray is less than the number of items needed for each of a plurality of serving destinations included in a determined route. For example, the electronic device may request a user (e.g., a manager and an employee) to replenish inventory or may move to a region where inventory replenishment may be performed.

In operation 340, the electronic device may perform interaction determined based on order information when reaching a destination (e.g., a first destination) to be visited. For example, the electronic device may perform an operation of indicating a serving tray accommodating an item needed for a visited destination through interaction. The electronic device may indicate the above-described serving tray through at least one of a display module, a sound output module, and a lighting module. The electronic device may output speech guiding to an item through the sound output module. The electronic device may illuminate light on a serving tray. The electronic device may slide a serving tray accommodating an item toward a customer by mechanically actuating the serving tray. The electronic device may provide guiding information customized for a service state of each destination or provide an item corresponding to an ordered menu item and a customer's characteristics at a destination.

In operation 350, the electronic device may revisit each destination by repeating a circular drive. For example, the electronic device may identify a destination to be revisited, based on order information based on POS data updated in real time. The electronic device may distinguish a destination requesting a revisit from a destination refusing a revisit, based on a service refusal history of each destination. The electronic device may identify a user's intent to request or refuse a revisit service through questions and answers, gesture recognition, and a variety of feedback. In addition, the electronic device, other than the service refusal history, may determine whether a customer sits in a destination and finishes their meal through vision recognition. Furthermore, the electronic device may determine when to initiate a drive along a current route, based on the amount of time elapsing from a drive along a previous route. Operations 340 and 350 described above may be performed repeatedly after initiating a first circular drive.

However, operations 310 to 350 described above may not be limited to being performed sequentially, and each operation may be performed sequentially with or in parallel to another operation. For example, sensing inventory in operation 330 may be illustrated as being performed before operation 340, but examples are not limited thereto. The electronic device may perform inventory sensing while performing operation 340, between performing operations 340 and 350, or while performing operation 350.

The electronic device may be implemented as a serving robot and may operate in a public environment (e.g., a family restaurant and a franchise restaurant) involving a circular drive.

Figure 4:
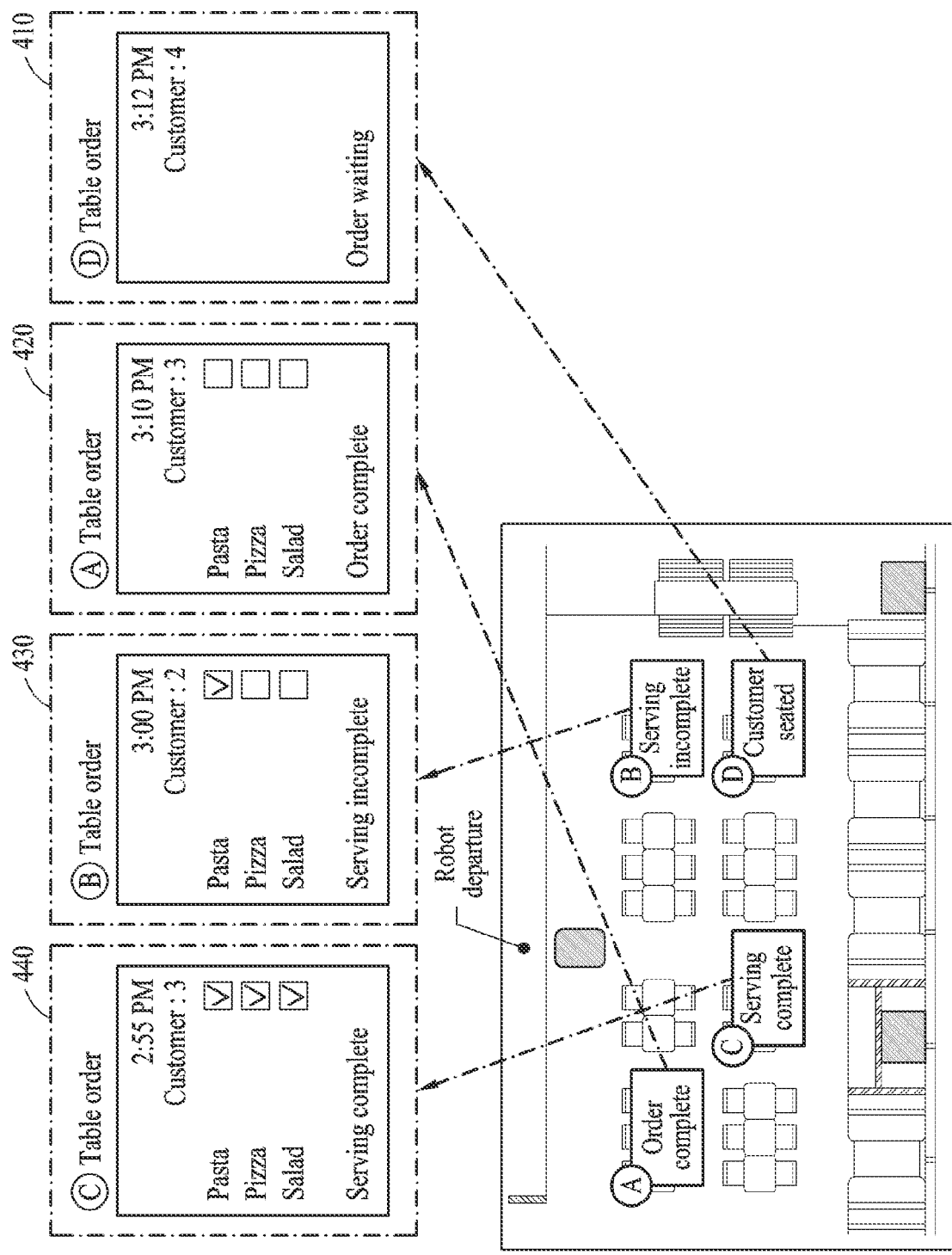
FIG. 4 is a diagram illustrating an example determining a service state according to various example embodiments.

FIG. 4 is a diagram illustrating an example operation of determining a service state according to various example embodiments.

An electronic device (e.g., the electronic device 101 of FIG. 1) may classify each destination into one of a plurality of service states, based on order information. For example, a service state may be classified into order waiting 410, order complete 420, service incomplete 430, and serving complete 440. However, the service state may not be limited to the foregoing example and may further include payment complete and destination empty.

TABLE 1

| Service state | Required visit counts | Required item |
|---|---|---|
| order waiting | 1 visit | menu, water, tableware, plate |
| order complete | no visit required | none |
| serving incomplete | 1 visit | side dish |
| serving complete | 1 or more visits | side dish |

The order waiting 410 may be a state in which a customer sits in a destination and is yet to place an order. Delivery of a basic item (e.g., a menu, water, tableware, and a plate) may be needed for a destination of which a state is determined to be the order waiting 410. The electronic device may guide a customer to a serving tray accommodating the basic item and provide the basic item to the customer by visiting the destination determined to be the order waiting 410 once. The order complete 420 may be a state in which a customer sitting in a destination orders an item and the ordered item is yet to be served. For example, the order complete 420 may refer to a state after receiving an order from at least one customer at a destination (e.g., a first destination) and before delivering at least one item indicated in the order from the destination. A destination determined to be the order complete 420 may not need a visit because there is no required item. The serving incomplete 430 may be a state in which some items are delivered among ordered items and a state in which a customer places an order, receives some ordered food items but not all ordered food items. The serving complete 440 may be a state in which all ordered items are delivered and a state in which all ordered food items are completely served. A destination determined to be the serving incomplete 430 or the serving complete 440 may need delivery of an auxiliary item related to an ordered item. The electronic device may guide a customer to a serving tray accommodating the auxiliary item and provide the auxiliary item to the customer by visiting the destination determined to be the serving incomplete 430 or the serving complete 440 one or more times. In addition, the electronic device, according to an order, may further guide the customer to a serving tray accommodating an additional item.

In FIG. 4, an example is illustrated as table D being the order waiting 410, table A being the order complete 420, table B being the serving incomplete 430, and table C being the serving complete 440.

Payment complete may be a state in which all items are completely served and payment for the served items is also completed. Destination empty may be a destination in which a seated customer has left or a customer is yet to be seated.

Figure 5:
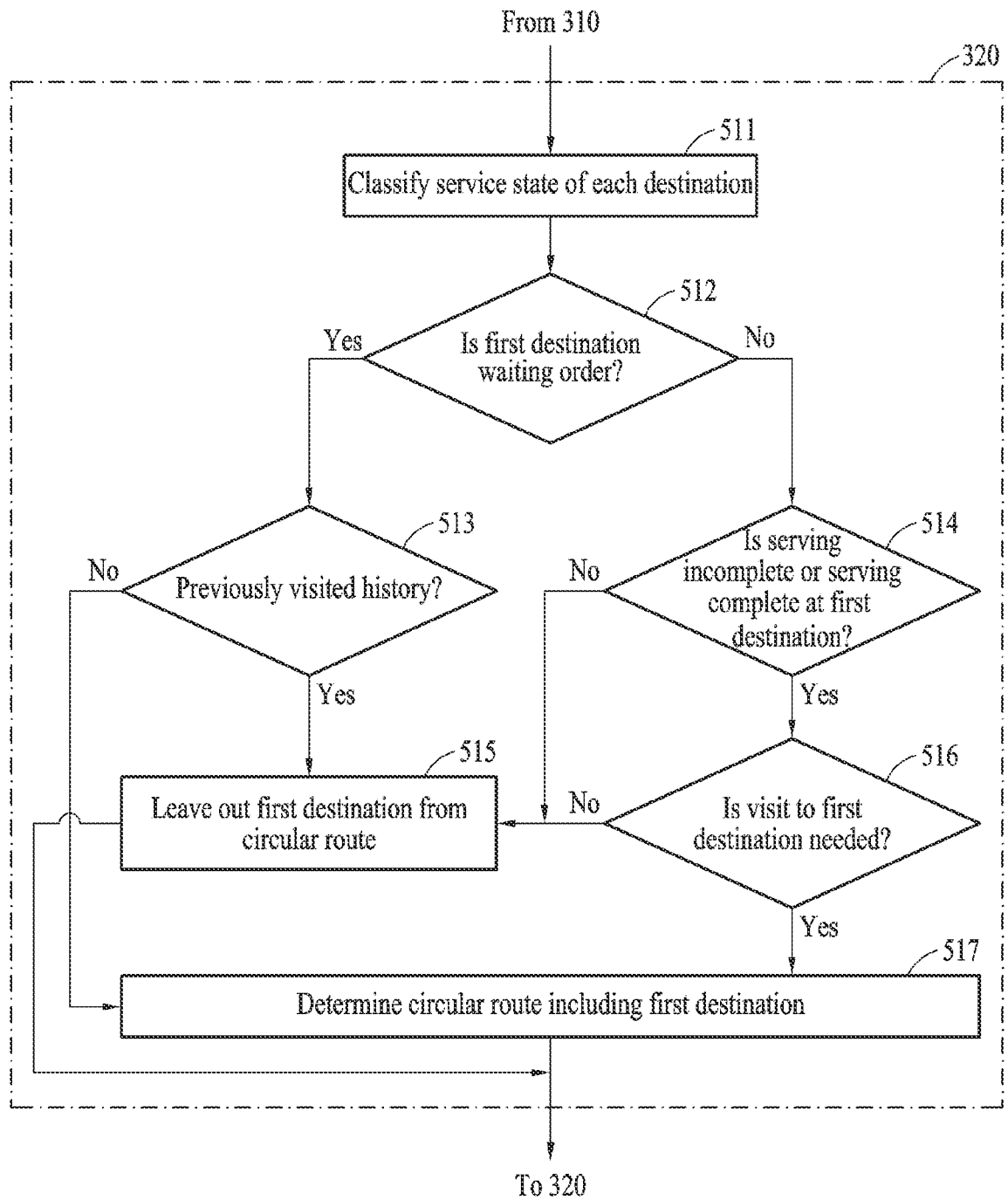
FIG. 5 is a flowchart illustrating an example method of determining a route according to various example embodiments.

FIG. 5 is a flowchart illustrating an example operation of determining a route according to various example embodiments.

In operation 511, the electronic device, as described above with reference to FIG. 4, may classify a service state of each destination. In operation 512, the electronic device may determine, among a plurality of destinations, whether a first destination is in an order waiting state. In operation 513, the electronic device, when the first destination is in an order waiting state, may determine whether the first destination has a previously visited history. For example, the electronic device may determine whether to visit the first destination in an order waiting state at least once. In operation 515, the electronic device may exclude the first destination from a route when visiting the first destination in an order waiting state at least once. In operation 514, the electronic device, when the first destination is not in an order waiting state, may determine whether a state of the first destination is serving incomplete or serving complete. In operation 515, the electronic device may exclude the first destination from the route when the first destination is not in a serving incomplete or serving complete state, in other words, is in an order complete state. In operation 516, the electronic device may determine whether a visit is needed for the first destination in a serving incomplete or serving complete state.

In operation 516 described above, the electronic device may determine whether the visit is needed according to a priority of each destination. The electronic device may determine a visiting order based on order information including at least one of seated information of each destination, order receiving information, order menu information, serving information, and whether an additional item has been requested. For example, the electronic device may form a route in a visiting order determined based on at least one of a seated time (e.g., a time elapsing from when a customer is seated) of each destination, order receiving information (e.g., receiving an order), or whether an additional item has been requested. The electronic device may determine a destination of which a seated time is the longest among the plurality of destinations to be a destination to be preferentially visited. Then, the electronic device may determine a destination identified to be in an order waiting state to be a destination to be visited. The destination in an order waiting state may need to be provided with a basic item for having a meal. In addition, the electronic device may determine a destination with a special order to be a destination to be visited with the next priority. As described above, the special order may require an additional item, and the additional item may include, for example, special tableware, tableware for sharing food, or additional tableware. On the other hand, a general order may be an order for a menu item only providing a main item.

In operation 517, the electronic device may determine a route including the first destination being in an order waiting state and having no previously visited history and to which a visit is determined to be needed. For example, the electronic device may drive itself along a route (e.g., a default route) including a plurality of default destinations using a driver. The electronic device, when a drive along the route has been completed, in operation 516 described above, may modify the route by excluding, among the plurality of default destinations included in the default route, a destination to which a visit is determined to be skipped. The electronic device may drive itself along the modified route using the driver.

For reference, when determining a route, the electronic device may exclude, from the route, a destination where intent of refusal is expressed. The electronic device may exclude the destination from the route until a customer expressing the intent of refusal leaves. However, after the customer expressing the intent of refusal leaves, the electronic device may reset a service refusal history related to the intent of refusal expressed at the destination.

The electronic device may perform operations 512 to 517 described above after completing an individual circular drive and before initiating a next circular drive. However, examples are not limited thereto.

Figure 6:
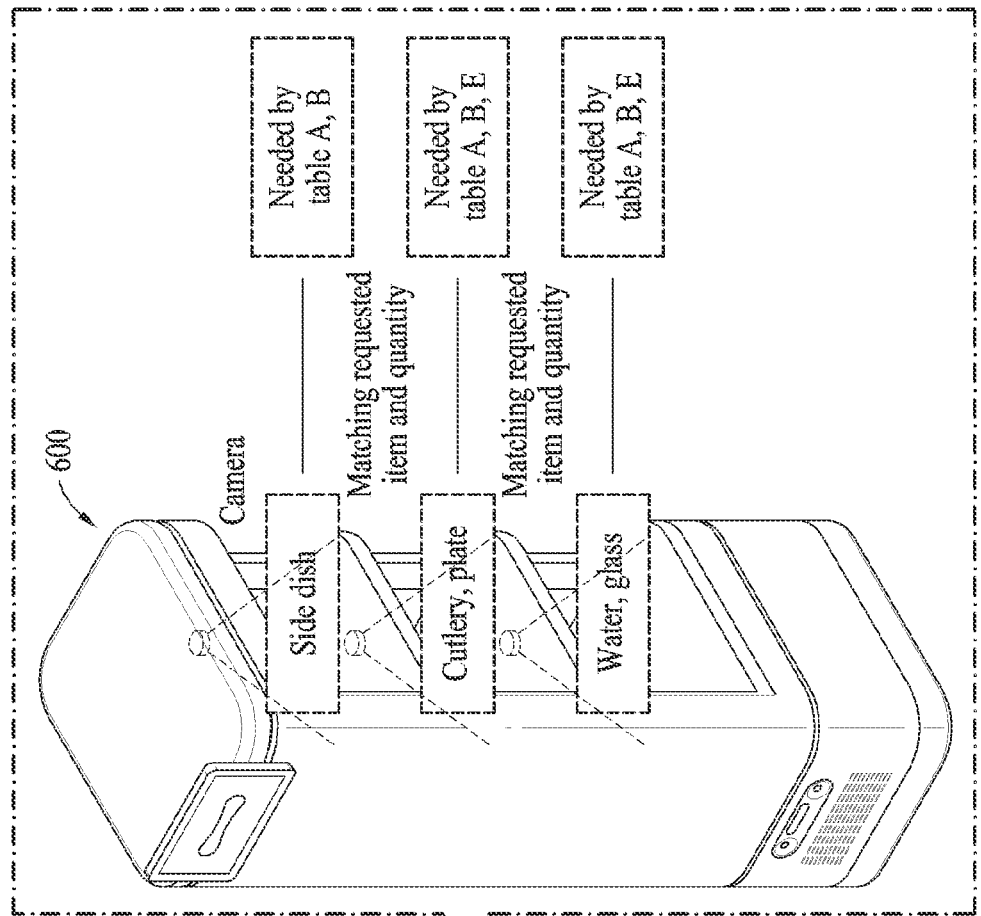
FIG. 6 is a diagram illustrating an example operation of sensing inventory according to various example embodiments.
Figure 6:
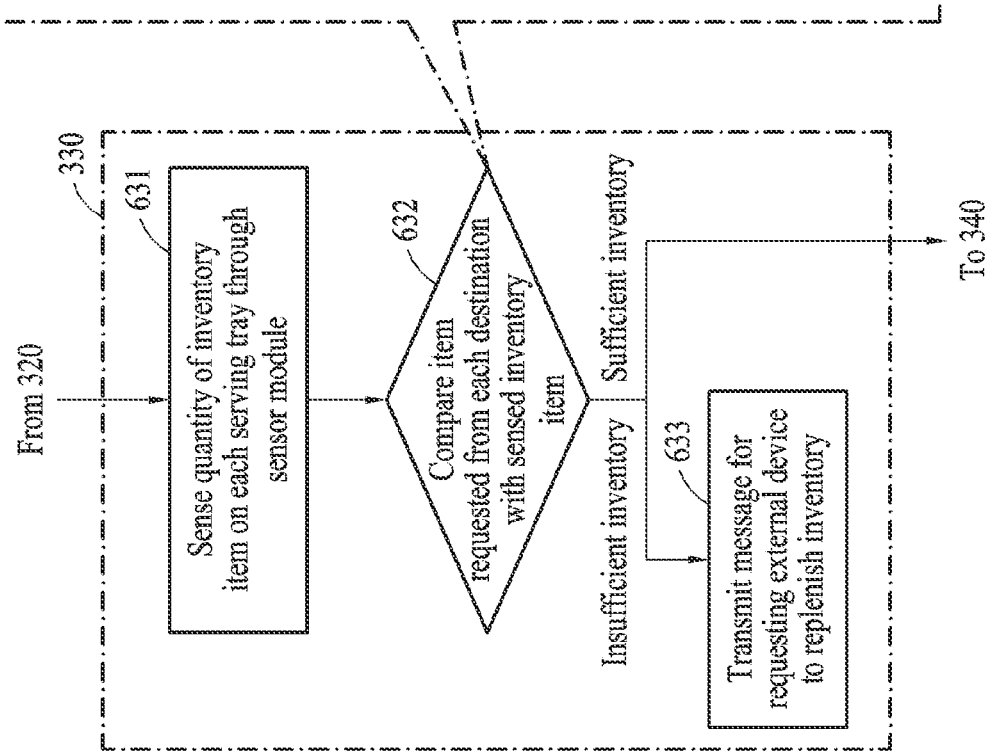

FIG. 6 is a diagram illustrating an example operation of sensing inventory according to various example embodiments.

An electronic device 600 (e.g., the electronic device 101 of FIG. 1) may further include a sensor module that may sense an inventory item on each serving tray. The electronic device 600 may sense, through the sensor module, an inventory quantity of the inventory item on each serving tray accommodating each inventory item. Although in FIG. 6, for example, a camera module is illustrated as the sensor module, examples are not limited thereto. Various examples of the sensor module may be described below with reference to FIG. 7.

In operation 631, the electronic device 600 may sense an inventory item and a quantity of the inventory item on each serving tray. For example, the electronic device 600 may capture an image including an inventory item on a serving tray through a camera sensor and may identify the type and quantity of the inventory item by analyzing the captured image.

In operation 632, the electronic device 600 may compare an item needed for each destination with the sensed inventory item. For example, the electronic device 600 may match the type and quantity of the needed item, based on order information of each destination, with the types and quantities of inventory items on serving trays. In the example illustrated in FIG. 6, side dishes on a first serving tray may be needed for tables A and B. Cutlery and plates on a second serving tray may be needed for tables A, B, and E. Water and glasses on a third serving tray may be needed for tables A, B, and E.

In operation 633, the electronic device 600, in response to insufficient inventory as a result of comparing the item needed for each destination with the sensed inventory item, may transmit a message for requesting inventory replenishment to an external device. For example, the electronic device 600 may transmit a signal for requesting the supply of inventory items to a terminal (e.g., a wearable device) of a user (e.g., an employee). However, examples are not limited to the foregoing example. The electronic device 600 may move to a region (e.g., a storage where inventory is stocked or a region adjacent to the storage) for replenishing inventory when inventory is insufficient.

The electronic device 600 may perform a circular drive according to operation 340 when inventory is determined to be sufficient.

Figure 7:
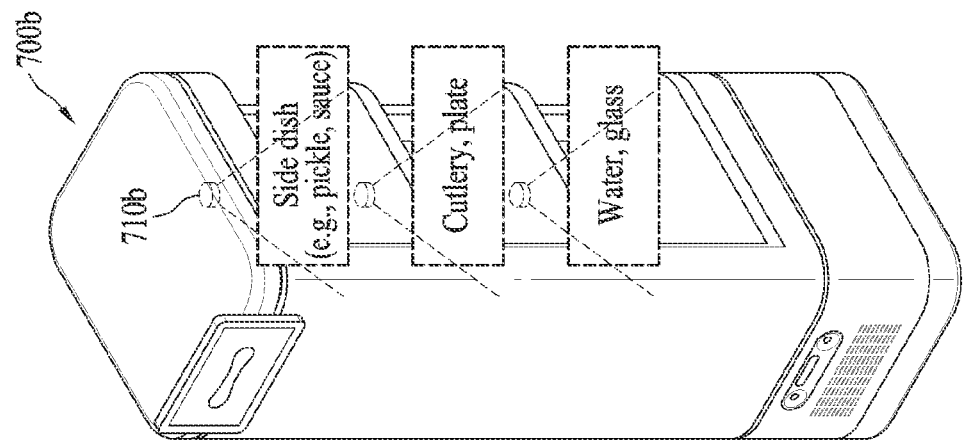
FIG. 7 is a diagram illustrating an example inventory sensor according to various example embodiments.
Figure 7:
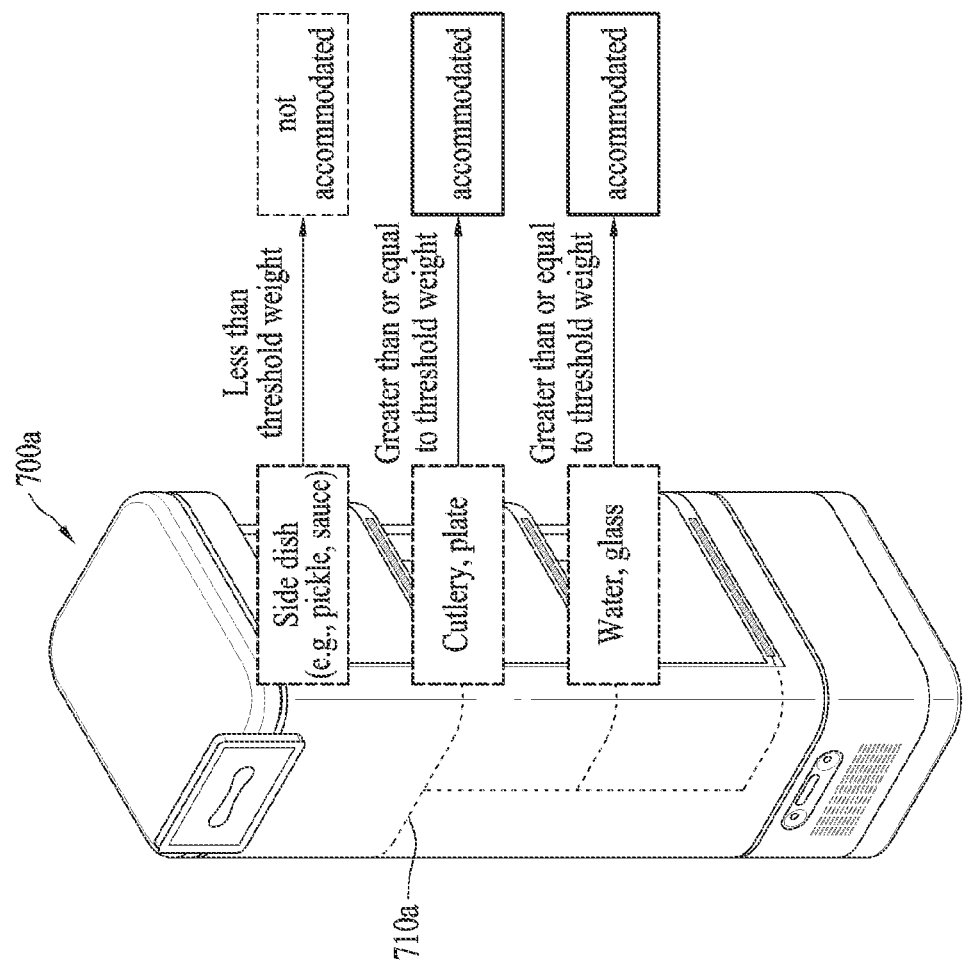

FIG. 7 is a diagram illustrating an example inventory sensor according to various example embodiments.

Electronic devices 700a and 700b may further include a sensor module including at least one of a camera sensor for capturing an inventory item on each serving tray, a weight sensor 710a for measuring the weight of the inventory item on each serving tray, and a distance sensor for measuring the distance from the distance sensor to the inventory item on each serving tray.

The electronic device 700a illustrates an example of an inventory sensor including the weight sensor 710a. The weight sensor 710*a* may be included in each serving tray and may measure the weight of an object on a serving tray. The electronic device 700*a* may determine whether the object's weight detected by the weight sensor 710*a* in each serving tray is greater than or equal to a threshold weight. The electronic device 700*a*, when the object's weight is less than the threshold weight, may determine that an inventory item on a serving tray is insufficient. The electronic device 700*b*, when the object's weight is greater than the threshold weight, may determine that an inventory item on a serving tray is sufficient.

The electronic device 700*b* illustrates an example of an inventory sensor including a depth sensor 710*b*. The depth sensor 710*b* may include, for example, a time-of-flight (ToF) sensor. The depth sensor 710*b* may measure a distance to an inventory item. In other words, the electronic device 700*b*, through the distance to the inventory item measured by the depth sensor 710*b*, may estimate a height, from the bottom of each serving tray, of stacked inventory items on a serving tray. The electronic device 700*b* may determine a quantity of inventory items, based on the estimated height of the stacked inventory items and a volume defined for each type of inventory item.

In the foregoing examples, a type of inventory items accommodated in each serving tray may be predetermined. For example, a first serving tray that is highest may accommodate side dishes, a second serving tray in the middle may accommodate tableware, and a third serving tray that is lowest may accommodate tableware related to an alcoholic beverage. The electronic devices 700*a* and 700*b* may determine the height and weight corresponding to a required quantity, based on item types designated for each serving tray. Accordingly, the electronic devices 700*a* and 700*b* may verify whether an inventory item is on a serving tray even though there is no vision recognition based on a camera or the vision recognition is unavailable.

Figure 8:
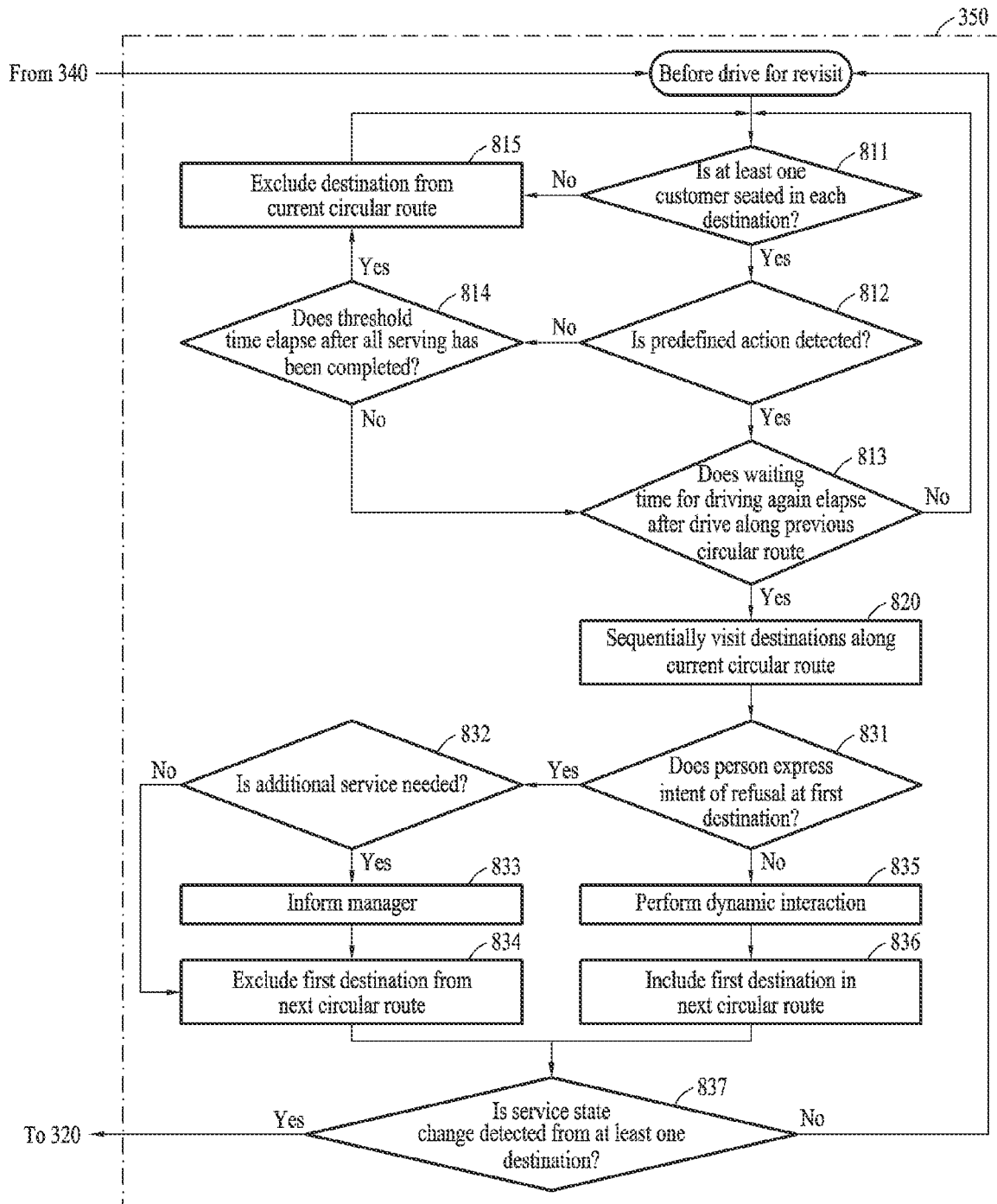
FIG. 8 is a flowchart illustrating an example operation of modifying a route for a revisit, according to various example embodiments.

FIG. 8 is a diagram illustrating an example operation of modifying a route for a revisit, according to various example embodiments.

An electronic device (e.g., the electronic device 101 of FIG. 1) may determine a subsequent route (e.g., a current route) to a route (e.g., a previous route) based on a service refusal history received from a customer at a destination included in the route, when completing a drive along the route. For example, the electronic device, after performing a circular drive along the previous route in operation 340, may determine the current route in operation 350. For reference, the electronic device may determine the route, based on whether each destination has completed payment except for the service refusal history. For example, the electronic device, by excluding a destination having completed payment among destinations included in the previous route, may generate the current route.

For example, the electronic device, before initiating a drive along the subsequent route (e.g., the current route), may determine the subsequent route, based on seated information of each destination in the subsequent route and a detection result of a predefined action at each destination. In operation 811, the electronic device may determine whether at least one customer sits in each of destinations potentially to be visited in the current route. For example, the electronic device, by analyzing an image capturing a destination through a camera module, may detect a customer within a region corresponding to the destination. In operation 815, the electronic device may exclude a destination in which no one sits from destinations in the current route. In other words, the electronic device may exclude a destination with no customers from the current route.

In operation 812, the electronic device may determine whether a predefined action is detected in a destination in which at least one customer sits among the destinations in the current route. For example, the electronic device may detect, as a predefined action, whether a customer is eating. The electronic device may identify a customer's action by analyzing an image capturing a destination. The electronic device may determine whether the customer performs an action of holding tableware and bringing their hands from a plate to the mouth one or more times within a threshold time. In operation 814, the electronic device may determine whether a threshold time elapses from when all serving has been completed for a destination where a predefined action is not detected. In operation 815, the electronic device may exclude, from the destinations of the current route, a destination where a predefined action is not detected and a threshold time elapses after all serving has been completed. In other words, the electronic device may exclude a destination where a customer has finished eating and the threshold time has elapsed from the current route.

According to operations 811, 812, 814, and 815 described above, the electronic device may modify the current route by maintaining or excluding destinations potentially included in the current route.

In operation 813, the electronic device, after determining the current route, may determine whether a waiting time for driving again elapses after a drive along the previous route. The waiting time for driving again may be a threshold time interval set between previous and current circular drives and may be set for cyclical, circular serving that is temporally spaced apart from another serving. For example, the electronic device may determine from when to initiate a drive along the subsequent route (e.g., the current route), based on a waiting time elapsing after completing the drive along the route (e.g., the previous route). In operation 820, the electronic device may sequentially visit destinations along the current route when the waiting time for driving again has elapsed after a previous drive. In other words, the electronic device may perform serving along the current route when the waiting time for driving again elapses after completing serving along the previous route.

In operation 831, the electronic device may determine whether a person (e.g., a customer) at a first destination expresses intent of refusal. The intent of refusal may be intent to refuse a service provided by a serving robot. The electronic device may determine the intent of refusal, based on at least one of a voice input received from a customer, a gesture input based on vision recognition, and other inputs. For example, the electronic device may receive a voice input through a microphone, identify speech from the voice input through a speech recognition engine (e.g., a machine-learning model), and determine whether the identified speech includes intent of refusal. The electronic device may identify a customer's gesture from an image capturing the customer and determine whether the identified gesture (e.g., shaking their head) includes intent of refusal. As another example, the electronic device may also verify the intent of refusal through a direct input (e.g., a touch input) to an input module from a customer. When the intent of refusal is verified at the first destination, the electronic device may record the intent of refusal in a service refusal history received from the customer at the first destination.

In operation 832, the electronic device, in response to the intent of refusal expressed by the customer at the first destination, may determine whether an additional service is needed. The additional service may be a service involving the intervention of a user (e.g., an employee). In operation 833, the electronic device, in response to determining that the additional service is needed, may receive a feedback input (e.g., a voice input, a gesture input, and a direct input) from a customer and may inform a manager (e.g., the user) of the received feedback input. For example, the electronic device may transmit the feedback input received from the customer to a terminal (e.g., a wearable device) of the user. After completing the current circular drive, in operation 834, the electronic device may exclude, from a next route, the first destination where there is the customer that expressed the intent of refusal. The next route may be a route where the electronic device circulates after completing a circular drive along a current route.

In operation 835, unlike operation 834 described above, the electronic device may perform a dynamic interaction at the first destination. An example of a dynamic interaction is described below with reference to FIGS. 9 to 13. In operation 836, the electronic device may include the first destination in the next route since the customer at the first destination did not express an intent of refusal.

The electronic device, by sequentially visiting the destinations in the current route and performing operations 831 to 836 described above, may maintain each destination in the next route or exclude each destination from the next route.

In operation 837, the electronic device may detect a service state change from at least one destination. For example, the electronic device may repeatedly revisit along a route, as illustrated in FIG. 8, before a service state change occurs. As another example, the electronic device, in response to the service state change from at least one destination, may return to operation 320, generate a new route, and perform serving along the new route.

Figure 9:
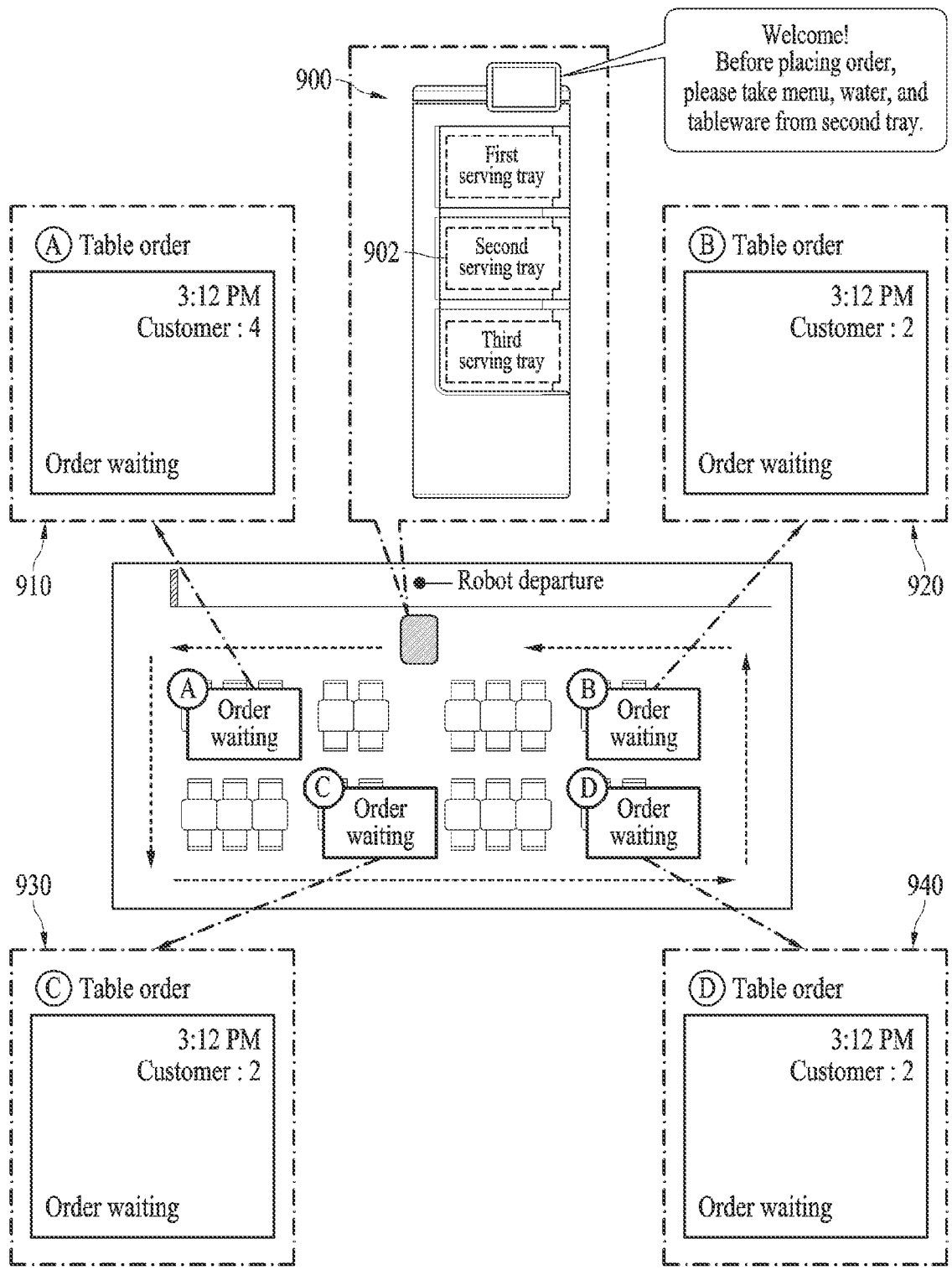
FIG. 9 is a diagram illustrating an example operation of performing a circular drive on a plurality of destinations having the same serving state by an electronic device according to various example embodiments.

FIG. 9 is a diagram illustrating an example operation of performing a circular drive on a plurality of destinations having the same serving state by an electronic device according to various example embodiments.

As described above, an electronic device 900 (e.g., the electronic device 101 of FIG. 1) may determine whether to visit each destination, based on a service state of each destination, and may drive itself along a route including a destination determined to be visited. The electronic device 900 reaching each destination may perform an interaction corresponding to a service state of each destination.

In the example illustrated in FIG. 9, destinations 910, 920, 930, and 940 included in the route may be in an order waiting state. The electronic device 900, while moving along the route using a driver, in response to not receiving an order from a first destination on which identified is seated information indicating at least one seated customer, may perform an operation of outputting information indicating a serving tray accommodating a basic item when reaching the first destination. For example, the outputting information indicating a serving tray accommodating a basic item may include at least one of outputting, on a display module, visual information indicating the serving tray accommodating the basic item, outputting, from a sound output module, auditory information indicating the serving tray accommodating the basic item, and emitting light indicating the serving tray accommodating the basic item through a lighting module. For example, a second serving tray 902 among a plurality of serving trays may accommodate the basic item (e.g., a menu, water and tableware). The electronic device 900 may output speech sound indicating the second serving tray and emit light on the second serving tray.

Figure 10:
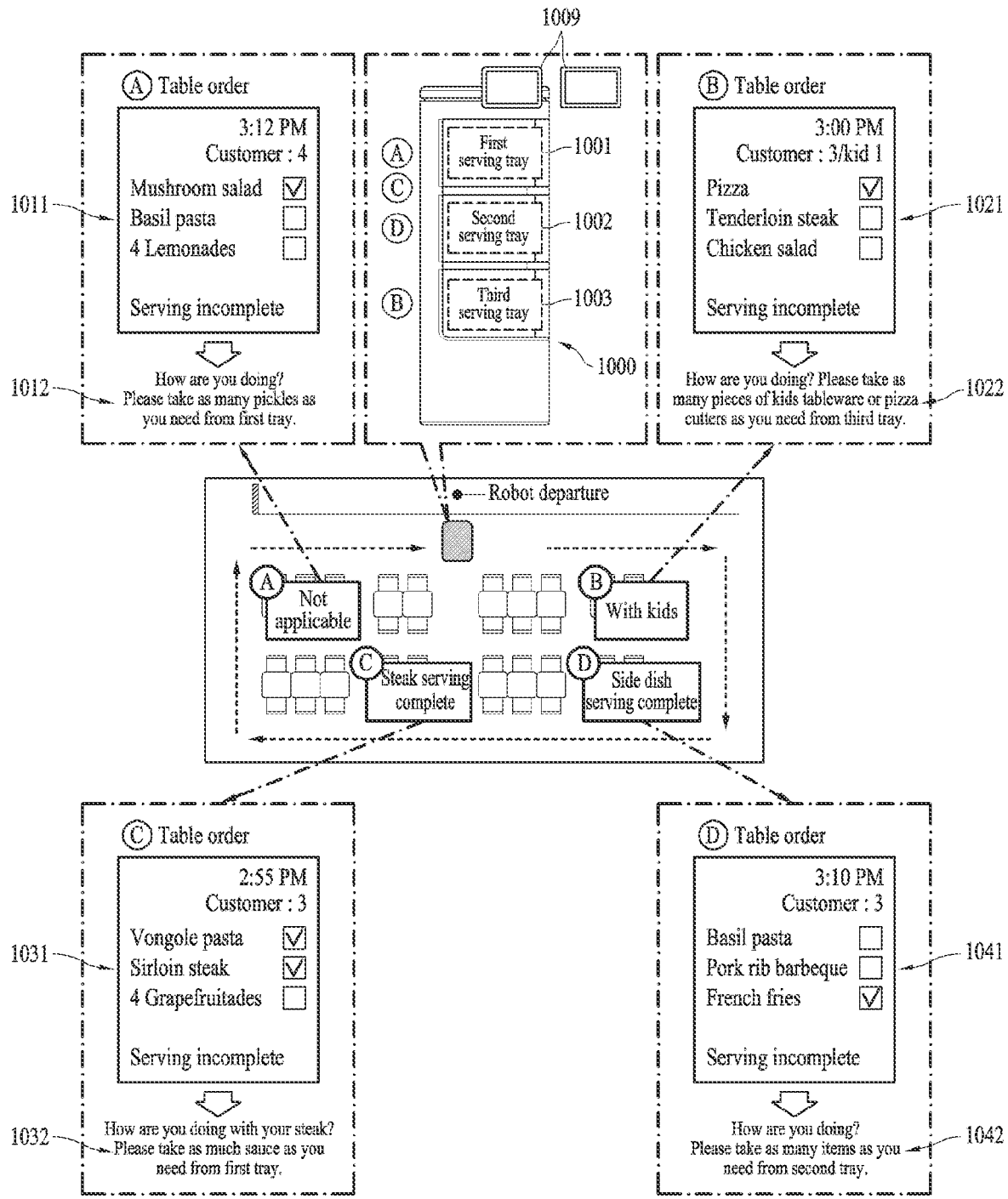
FIG. 10 is a diagram illustrating an example drive along a route including a destination to which a special order is received by an electronic device according to various example embodiments.

FIG. 10 is a diagram illustrating an example drive along a route including a destination to which a special order is received by an electronic device according to various example embodiments.

An electronic device 1000 may store items for each type on each of the plurality of serving trays and may travel along a circulation route. For example, a first serving tray 1001 of the electronic device 1000 may accommodate an auxiliary item (e.g., a side dish including pickles and sauce). A second serving tray 1002 may accommodate a basic item. A third serving tray 1003 may accommodate an additional item (e.g., kids tableware and a pizza cutter). The electronic device 1000 may perform an interaction based on a service state of a destination at each destination to be visited while driving itself along a route.

In the example illustrated in FIG. 10, the electronic device 1000 may sequentially visit a first destination 1021 (e.g., table B), a second destination 1041 (e.g., table D), a third destination 1031 (e.g., table C), and a fourth destination 1011 (e.g., table A). Some of ordered items may have been delivered to the first, second, third, and fourth destinations 1021, 1041, 1031, and 1011.

The electronic device 1000, in response to recognizing delivery of at least one item indicated in an order received from a destination, may perform an operation of indicating a serving tray accommodating an auxiliary item relevant to the at least one item. For example, the electronic device 1000 may perform at least one of outputting, on a display module, an image indicating the serving tray accommodating the auxiliary item, outputting, from a sound output module, speech sound indicating the serving tray accommodating the auxiliary item, and emitting, from a lighting module, light indicating the serving tray accommodating the auxiliary item. The lighting module may emit light toward an item on a serving tray or light from one side of the serving tray. In the example illustrated in FIG. 10, the electronic device 1000, at the third destination 1031, may output a guide 1032 (e.g., speech sound and text) to the first serving tray 1001 accommodating an auxiliary item (e.g., sauce) accompanied by one (e.g., steak) of the delivered items. The electronic device 1000, at the fourth destination 1011, may output a guide 1012 to the first serving tray 1001 accommodating an auxiliary item (e.g., pickles) accompanied by a delivered item (e.g., a salad).

In addition, the electronic device 1000, based on a type of order received independently from a service state, may determine a serving tray to be guided at each destination. For example, an order (e.g., a pizza order) involving an additional item (e.g., kids tableware and tableware for sharing food) may be received from the first destination 1021. The electronic device 1000, in response to receiving an order for which an additional item is needed from a customer at the first destination 1021, may perform an operation of indicating a serving tray accommodating the additional item at the first destination 1021. For example, the electronic device 1000 may perform at least one of outputting, on a display module 1009, an image indicating the serving tray accommodating the auxiliary item, outputting, from a sound output module, speech sound indicating the serving tray accommodating the auxiliary item, and emitting, from a lighting module, light indicating the serving tray accommodating the auxiliary item. In the example illustrated in FIG. 10, the electronic device 1000 may output a guide 1022 to the third serving tray 1003 accommodating tableware for sharing food (e.g., a pizza cutter) as an additional item needed for an item (e.g., pizza) delivered to the first destination 1021. In addition, the electronic device 1000 may output the guide 1022 to the third serving tray 1003 accommodating an additional item (e.g., kids tableware) for a child customer among customers at the first destination 1021.

The electronic device 1000 may guide a customer to a serving tray (e.g., the second serving tray 1002) accommodating a basic item at a destination where all auxiliary and additional items needed to be provided in a service state of the destination have been provided. For example, at the second destination 1041, an auxiliary item (e.g., ketchup) accompanied by an item (e.g., French fries) delivered in a serving incomplete state may have been delivered already. The electronic device 1000 may output a guide 1042 to a basic item at the second destination 1041.

Figure 11:
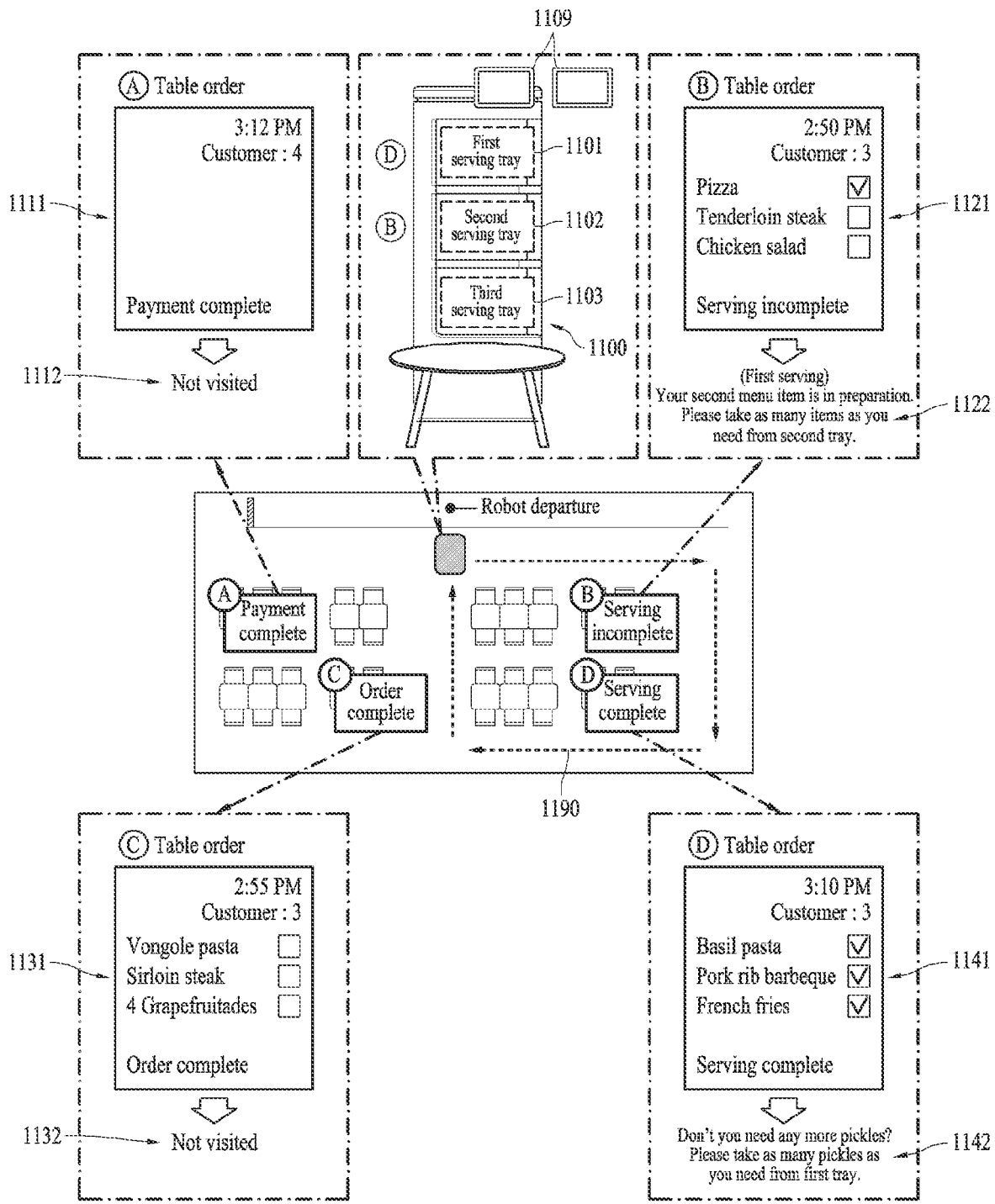
FIG. 11 is a diagram illustrating an example drive along a route including a plurality of destinations having different service states by an electronic device according to various example embodiments.

FIG. 11 is a diagram illustrating an example drive along a route including a plurality of destinations having different service states by an electronic device according to various example embodiments.

An electronic device 1100, when a drive along a route is completed, in response to not delivering, to a first destination, at least one item indicated in an order received from the first destination, may exclude the first destination from the route. For example, the electronic device 1100 may exclude, from the route, a destination having completed payment or a destination where an order has been received and at least one item indicated in the order is yet to be delivered. For example, in the example illustrated in FIG. 11, a fourth destination 1111 may be in a payment complete state and may not need to be visited. A third destination 1131 may be in an order complete state where an order has been received but none of the ordered items have been delivered at all. The electronic device 1100 may determine not to visit the third and fourth destinations 1131 and 1111 respectively in operations 1132 and 1112 and exclude the third and fourth destinations 1131 and 1111 from a route 1190. Accordingly, the electronic device 1100, unlike the description provided with reference to FIGS. 9 and 10, may drive itself along the route 1190 modified from a default route.

However, examples are not limited to a destination in an order complete state, such as the third destination 1131, being always excluded from a route. The electronic device 1100 may include the destination in an order complete state in the route when the destination does not have a visited history. The electronic device 1100 may output information guiding a customer to a serving tray (e.g., a second serving tray 1102) accommodating a basic item at a destination having no visited history using at least one of a display module 1109, a sound output module, and a lighting module. When there is no visited history, basic tableware needed for having a meal may not be set. As another example, the electronic device 1100 may visit a destination in an order complete state in response to a customer's request. The electronic device 1100, in response to receiving a request for an additional item (e.g., water and glasses) from a customer, may guide the customer to a serving tray (e.g., a third serving tray 1103) accommodating the additional item by visiting a destination where the customer is located.

In FIG. 11, a first destination 1121 may be in a serving incomplete state and auxiliary and additional items related to an ordered item (e.g., pizza) may have been delivered already. The electronic device 1100, in response to a plurality of visits to the first destination 1121 in a serving incomplete state, when reaching the first destination 1121, may provide a guide 1122 to a serving tray (e.g., the second serving tray 1102) accommodating a basic item. A second destination 1141 may be in a serving complete state, and the electronic device 1100 may provide a guide 1142 to a serving tray (e.g., a first serving tray 1101) accommodating an auxiliary item.

Figure 12:
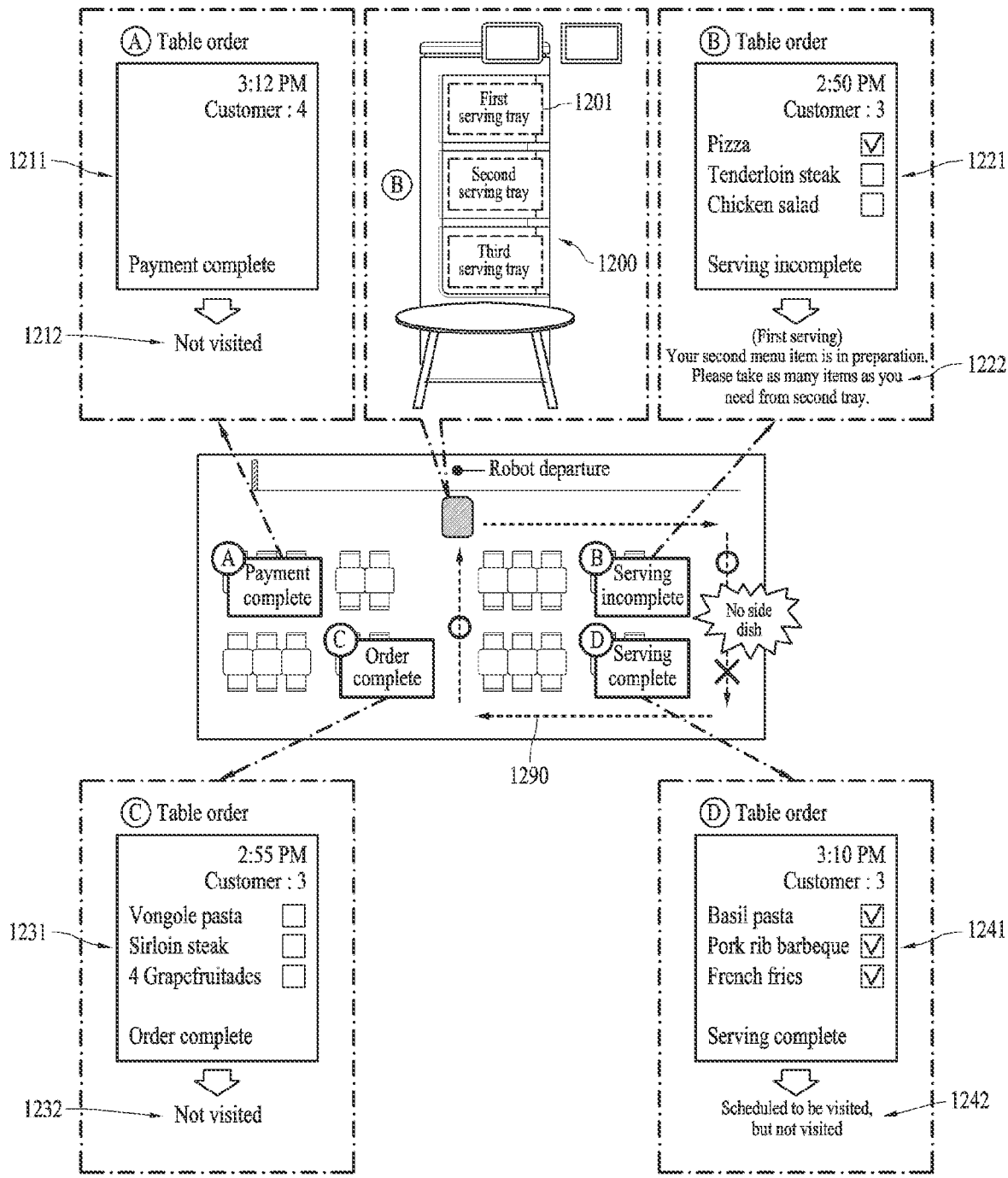
FIG. 12 is a diagram illustrating an example of skipping some destinations when inventory is insufficient during a circular drive by an electronic device according to various example embodiments.

FIG. 12 is a diagram illustrating an example of skipping some destinations when inventory is insufficient during a circular drive by an electronic device according to various example embodiments.

An electronic device 1200, in response to insufficient inventory while driving a route, may continue a drive to the remaining first destination of the first destination and a second destination of the route while skipping the second destination for which an inventory item is insufficient for a needed item.

The same example of order information of each destination as the example provided in FIG. 11 is illustrated in FIG. 12. The electronic device 1200 may not visit third and fourth destinations 1231 and 1211 respectively in operations 1232 and 1212. The electronic device 1200 may provide a guide 1222 to a second serving tray accommodating a basic item, similar to the description provided with reference to FIG. 11. In the example illustrated in FIG. 12, the electronic device 1200 may sequentially visit first and second destinations 1221 and 1241. The electronic device 1200 may detect, from a first serving tray 1201, insufficient inventory of an auxiliary item (e.g., pickles) needed for the second destination 1241 on the way to the second destination 1241. The electronic device 1200, while driving itself along a route 1290, may skip a visit to the second destination 1241 and visit the remaining destination.

As another example, the electronic device 1200, while driving itself along the route 1290, when a customer at one destination takes a greater quantity of an item than a quantity estimated to be needed, may have inventory of which the quantity is less than a quantity needed for a destination to be visited next. The electronic device 1200 may skip a visit to the destination scheduled to be visited next. In other words, the electronic device 1200 may monitor inventory in real time during a circular drive and may dynamically determine whether to visit each destination when the monitored inventory is insufficient. The electronic device 1200, when determining to skip a visit to a destination during the circular drive, may skip the destination while maintaining a route or modify the route by excluding the destination.

Figure 13:
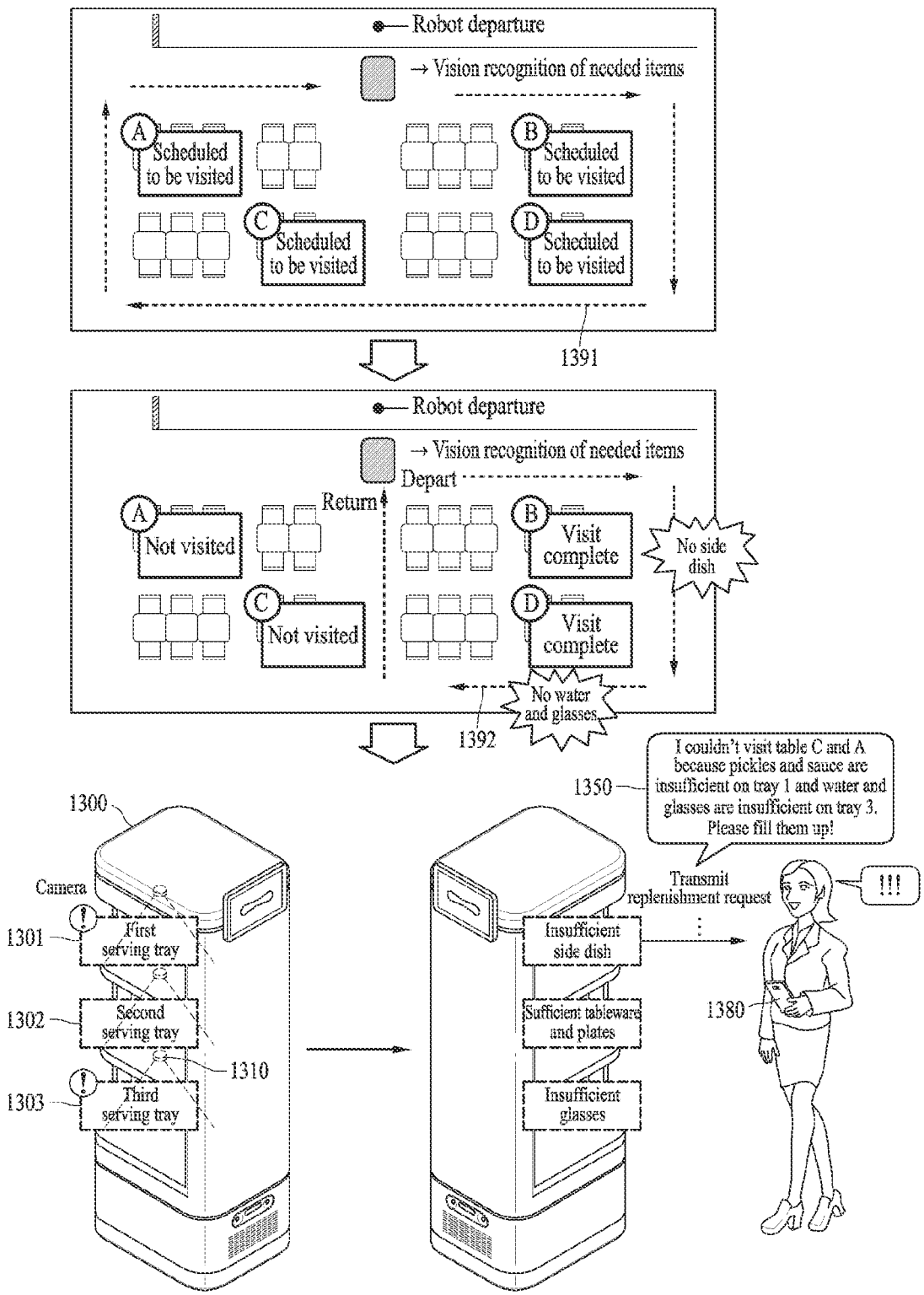
FIG. 13 is a diagram illustrating an example of reporting insufficient inventory to a manager by an electronic device according to various example embodiments.

FIG. 13 is a diagram illustrating an example operation of reporting insufficient inventory to a manager by an electronic device according to various example embodiments.

An electronic device 1300 may monitor inventory of each serving tray during a drive along a route 1391. When detecting insufficient inventory during the drive, the electronic device 1300 may skip a visit to a destination needing an item of which inventory is insufficient. The electronic device 1300 may form a new route 1392 by excluding some destinations from the route 1391. For example, in the example illustrated in FIG. 13, the electronic device 1300, which drove along the route 1391, in the middle of the route 1391, may detect that an auxiliary item (e.g., a side dish) and an additional item (e.g., water and glasses) are insufficient. In other words, the electronic device 1300 may detect insufficient inventory from first and third serving trays 1301 and 1303. As described above, the electronic device 1300, through a camera sensor 1310, may monitor inventory of the first serving tray 1301, a second serving tray 1302, and the third serving tray 1303.

For example, the electronic device 1300, in response to detecting insufficient inventory, may update an insufficient inventory situation in a database having recorded a customer's request. As another example, the electronic device 1300 may notify a user 1380 (e.g., an employee) of insufficient inventory. The electronic device 1300 may transmit a message including information 1350 (e.g., a type of insufficient item on the first and third serving trays 1301 and 1303) notifying the user 1380 of the insufficient inventory on a terminal (e.g., a wearable device and a device for executing an application for a manager) of the user 1380. Yet another example, the electronic device 1300 may move to a location near the user 1380 and directly request the user 1380 to replenish inventory by outputting, to the user 1380, the information 1350 notifying the user 1380 of the insufficient inventory through speech sound or on a display module.

In addition, other than notifying of the insufficient inventory, the electronic device 1300, when completing serving items by visiting each destination, may report serving completion to a POS device and a terminal (e.g., a wearable device) of the user 1380.

The electronic device 1300 may automatically determine a destination to be visited, based on each destination's service state determined based on order information, while autonomously, circular driving in a service space (e.g., a restaurant). The electronic device 1300 may guide a customer to a serving tray accommodating an item needed for each destination in each service state while driving itself along a route including the automatically determined destination.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   communication circuitry;
   a driver comprising a motor;
   at least one processor comprising processing circuitry; and
   memory comprising one or more storage medium storing instructions, that when executed individually and/or collectively by the at least one processor, cause the electronic device to:
   establish communication with an order server using the communication circuitry and receive order information from the order server,
   generate a route including a point of departure and a first destination determined based on the order information,
   based on the electronic device moving along the route using the driver, in response to not receiving an order from the first destination on which seating information indicating at least one seated customer is identified, perform an operation of outputting information indicating a serving tray accommodating a basic item based on the electronic device reaching the first destination, and
   based on a drive along the route including the first destination being completed, in response to an order from the first destination having been received and at least one item indicated in the received order not being delivered to the first destination, modify the route to exclude the first destination from the route.

2. The electronic device of claim 1, wherein
   the outputting information indicating the serving tray accommodating the basic item comprises:
   at least one of outputting, on a display, visual information indicating the serving tray accommodating the basic item, outputting, from a sound output module comprising sound output circuitry, auditory information indicating the serving tray accommodating the basic item, or emitting, from a lighting module comprising light providing circuitry, light indicating the serving tray accommodating the basic item.

3. The electronic device of claim 1, wherein
   the instructions, when executed individually and/or collectively by the at least one processor, cause the electronic device to:
   in response to recognizing delivery of the at least one item indicated in the order received from the first destination, perform an operation of indicating a serving tray accommodating an auxiliary item relevant to the at least one item.

4. The electronic device of claim 3, wherein the instructions, when executed individually and/or collectively by the at least one processor, cause the electronic device to:
   perform at least one of outputting, on a display, an image indicating the serving tray accommodating the auxiliary item, outputting, from a sound output module, speech sound indicating the serving tray accommodating the auxiliary item, and emitting, from a lighting module, light indicating the serving tray accommodating the auxiliary item.

5. The electronic device of claim 1, wherein the instructions, when executed individually and/or collectively by the at least one processor, cause the electronic device to;
   drive the electronic device along the route including a plurality of default destinations using the driver,
   based on a drive along the route being completed, modify the route by excluding, from the route, a destination to which a visit is determined to be skipped among the plurality of default destinations, and
   drive the electronic device along the modified route using the driver.

6. The electronic device of claim 1, wherein the instructions, when executed individually and/or collectively by the at least one processor, cause the electronic device to:
   form the route in a visiting order determined based on the order information including at least one of seating information of each destination, order receiving information, order menu information, serving information, or whether an additional item has been requested.

7. The electronic device of claim 1, further comprising:
   a sensor configured to sense an inventory item on each serving tray,
   wherein the instructions, when executed individually and/or collectively by the at least one processor, cause the electronic device to:
   sense, through the sensor, an inventory quantity of the inventory item on each serving tray accommodating each inventory item,
   in response to insufficient inventory based on comparing an item needed for each destination with the sensed inventory item, transmit, to an external device, a message for requesting inventory replenishment, and
   in response to insufficient inventory while driving the route including the first destination and a second destination, continue a drive to the first destination while skipping the second destination for which an inventory item is insufficient for a needed item.

8. The electronic device of claim 1, further comprising:
at least one of a camera sensor configured to capture an inventory item on each serving tray, a weight sensor configured to determine a weight of the inventory item on each serving tray, or a distance sensor configured to determine a distance from the distance sensor to the inventory item on each serving tray.

9. The electronic device of claim 1, wherein the instructions, when executed individually and/or collectively by the at least one processor, cause the electronic device to:
in response to completing a drive along the route, determine a subsequent route to the route, based on at least one of a service refusal history received from a customer at a destination including in the route or whether payment has been completed,
before initiating a drive along the subsequent route, determine the subsequent route, based on seating information of each destination of the subsequent route and a detection result of a specified action at each destination of the subsequent route, and
determine a time of initiating the drive along the subsequent route, based on a waiting time elapsing from a time of completing the drive along the route.

10. The electronic device of claim 1, wherein the instructions, when executed individually and/or collectively by the at least one processor, cause the electronic device to:
in response to receiving an order for which an additional item is needed from a customer at the first destination, perform an operation of indicating a serving tray accommodating the additional item at the first destination.

11. A method, performed by an electronic device, the method comprising:
receiving order information from an order server;
generating a route including a point of departure and a first destination determined based on the order information;
based on the electronic device moving along the route using a driver, in response to not receiving an order from the first destination on which seating information indicating at least one seated customer is identified, performing an operation of outputting information indicating a serving tray accommodating a basic item based on the electronic device reaching the first destination; and
based on a drive along the route including the first destination being completed, in response to an order from the first destination having been received and at least one item indicated in the received order not being delivered, to the first destination, at least one item indicated in an order received from the first destination, modifying the route to exclude the first destination from the route.

12. The method of claim 11, wherein
the performing the operation of outputting information indicating the serving tray accommodating the basic item comprises:
performing at least one of outputting, on a display, visual information indicating the serving tray accommodating the basic item, outputting, from a sound output module, auditory information indicating the serving tray accommodating the basic item, or emitting from a lighting module, light indicating the serving tray accommodating the basic item.

13. The method of claim 11, further comprising:
in response to recognizing delivery of the at least one item indicating in the order received from the first destination, indication a serving tray accommodating an auxiliary item relevant to the at least one item.

14. The method of claim 13, wherein
the indicating a serving tray accommodating an auxiliary item comprises:
perform at least one of outputting, on a display, visual information indicating the serving tray accommodating the auxiliary item, outputting, from a sound output module, auditory information indicating the serving tray accommodating the auxiliary item, and emitting, from a lighting module, light indicating the serving tray accommodating the auxiliary item.

15. The method of claim 11, further comprising:
driving along the route including a plurality of default destinations;
based on a drive along the route being completed, modifying the route by excluding, from the route, a destination to which a visit is determined to be skipped among the plurality of default destinations; and
driving along the modified route.

16. The method of claim 11, wherein
generating the route comprises:
forming the route in a visiting order determined based on the order information including at least one of seating information of each destination, order receiving information, order menu information, serving information, and whether an additional item has been requested.

17. The method of claim 11, further comprising:
sensing, through a sensor, an inventory quantity of an inventory item on each serving tray accommodating each inventory item,
in response to insufficient inventory as a result of comparing an item needed for each destination with the sensed inventory item, transmitting a message requesting inventory replenishment to an external device, and
in response to insufficient inventory while driving the route including the first destination and a second destination, continuing driving to the first destination while skipping the second destination for which an inventory item is insufficient for a needed item.

18. The method of claim 11, further comprising:
sensing an inventory item and inventory quantity of each serving tray using at least one of a camera sensor configured to capture an inventory item on each serving tray, a weight sensor configured to determine a weight of the inventory item on each serving tray, and a distance sensor configured to determine a distance from the distance sensor to the inventory item on each serving tray.

19. The method of claim 11, further comprising:
in response to completing a drive along the route, determining a subsequent route to the route, based on at least one of a service refusal history received from a customer at a destination included in the route or whether payment has been completed,
before initiating a drive along the subsequent route, determining the subsequent route, based on seating information of each destination of the subsequent route and a detection of a specified action at each destination of the subsequent route, and
determining a time of initiating the drive along the subsequent route, based on a waiting time elapsing from a time of completing the drive along the route.

20. A non-transitory computer-readable storage medium storing instructions that, when executed by a processor, cause the processor to perform the operations of claim 11.

* * * * *